United States Patent
Nelson et al.

(10) Patent No.: US 7,210,610 B2
(45) Date of Patent: May 1, 2007

(54) APPARATUS AND METHOD FOR PERFORMING NON-LINEAR FRICTION STIR WELDS ON EITHER PLANAR OR NON-PLANAR SURFACES

(75) Inventors: Tracy W. Nelson, Provo, UT (US); Carl D. Sorensen, Provo, UT (US); Perry W. Carter, Orem, UT (US); Thomas L. Kirkham, Jr., Provo, UT (US); David V. Kirkham, Provo, UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 10/161,295

(22) Filed: Jun. 3, 2002

(65) Prior Publication Data

US 2002/0190101 A1 Dec. 19, 2002

Related U.S. Application Data

(60) Provisional application No. 60/295,663, filed on Jun. 4, 2001.

(51) Int. Cl.
  B23K 20/12 (2006.01)
(52) U.S. Cl. ..................... 228/2.1; 228/112.1
(58) Field of Classification Search ................ 228/2.1, 228/112.1
  See application file for complete search history.

(56) References Cited

U.S. PATENT DOCUMENTS

| | | | | |
|---|---|---|---|---|
| 5,460,317 A | | 10/1995 | Thomas et al. | 228/112.1 |
| 5,697,544 A | * | 12/1997 | Wykes | 228/2.1 |
| 5,769,306 A | * | 6/1998 | Colligan | 228/112.1 |
| 5,971,247 A | | 10/1999 | Gentry | 228/2.1 |
| 6,068,178 A | * | 5/2000 | Michisaka | 228/112.1 |
| 6,070,784 A | | 6/2000 | Holt et al. | 228/112.1 |
| 6,168,066 B1 | * | 1/2001 | Arbegast | 228/102 |
| 6,173,880 B1 | | 1/2001 | Ding et al. | 228/2.1 |
| 6,199,745 B1 | * | 3/2001 | Campbell et al. | 228/112.1 |
| 6,367,681 B1 | * | 4/2002 | Waldron et al. | 228/112.1 |
| 6,450,395 B1 | * | 9/2002 | Weeks et al. | 228/112.1 |
| 6,769,595 B2 | * | 8/2004 | Stol et al. | 228/112.1 |
| 2002/0125297 A1 | * | 9/2002 | Stol et al. | |

OTHER PUBLICATIONS

A page from the University of South Carolina's website regarding "Friction Stir Welding." The URL is http://www.engr.sc.edu.
Pages from the website for TWI World Centre for Materials Joining Technology regarding "Friction Stir Welding at TWI." The URL is http://www.twi.co.uk/j32k/unprotected/band_1/fswintro.html.

* cited by examiner

*Primary Examiner*—Kevin P. Kerns
(74) *Attorney, Agent, or Firm*—Kirton & McConkie; Michael F. Krieger

(57) ABSTRACT

A method and device enabling friction stir welding along non-linear joint lines or seams on either planar or non-planar surfaces are provided. The device features four roller clamps located on upper and lower pieces. It also contains a non-consumable tool with a profiled probed end that engages work pieces and follows along a non-linear or linear joint lines in order to achieve high-integrity friction stir welds. No special anvil is required and the device can be manually or automatically operated and controlled. Operating similarly to a conventional sewing machine, this device and process enable an operator or user to manually guide work pieces to be welded through a friction stir welding tool and allows for flexibility in the path of the weld and the types of material being welded.

18 Claims, 6 Drawing Sheets

APPARATUS AND METHOD FOR PERFORMING NON-LINEAR FRICTION STIR WELDS ON EITHER PLANAR OR NON-PLANAR SURFACES

RELATED APPLICATION

This application claims priority to U.S. Provisional Patent Application Ser. No. 60/295,663, filed on Jun. 4, 2001, and entitled "APPARATUS AND METHOD FOR PERFORMING NON-LINEAR FRICTION STIR WELDS ON EITHER PLANAR OR NON-PLANAR SURFACES."

BACKGROUND

1. Field of Invention

This invention relates to an apparatus and method for friction-stir welding, and more particularly, to an apparatus and method for friction-stir welding along non-linear joints on either planar or non-planar surfaces.

2. Background of the Invention

A recent development in the welding industry, known as friction-stir welding, has revolutionized welding techniques and devices worldwide. Friction-stir welding involves plunging a non-consumable tool with a profiled, probed end into a joint line between two pieces of metal. A joint line is the small gap formed between pieces of metal being held tightly together. This gap is where the friction-stir weld occurs.

Specifically, in friction-stir welding, a weld occurs when the spinning, non-consumable tool is plunged into the joint line and forced to move along the joint line while spinning. Frictional heat is generated between the rotating tool and the pieces of metal contacted by the tool. The frictional heat softens the metal sufficiently that the stirring action of the rotating tool pulls metal across the joint line from each workpiece and fuses them together forming a weld. Though the metal is softened and plastically mixed, it is not melted. Fusion takes place below the melting temperature of the metal work pieces. The fundamental friction-stir welding process is fully described in the original patent held by The Welding Institute, U.S. Pat. No. 5,813,592.

Because the temperature of the work pieces does not reach the melting point it is possible to weld alloys that are difficult to weld by melting, such as certain aluminum alloys. There are other advantages of friction-stir welding over traditional welding. There are no fumes, spatter, and no shaded eye protection necessary for the operators. Because there is no melting, no shielding gas is needed to prevent contamination of liquid metal. There is no solidification shrinkage, so distortion of the work pieces is reduced. Friction-stir welding is also energy efficient compared to welding processes that melt metal.

Friction-stir welding offers some design advantages over traditional welding. The depth of penetration can be consistently and accurately controlled by tool geometry. Relatively deep weld joints can be achieved in a single pass. Butt, T, lap, and fillet joint configurations can be welded. Friction-stir welded joints also experience fewer traditional weld defects than joints produced by conventional welding processes.

There are also significant disadvantages with current friction-stir welding equipment and processes. The large thrust and side loads on the tool in most cases make it impossible to manually guide the weld the way one would with traditional welding processes. In friction-stir welding, the pieces to be welded are securely clamped to a rigid backing plate to resist the large side loads from the tool tending to separate the joint. This limits the current process to joints that can be clamped to a flat backing plate mounted on a large machine with heavy-duty spindle bearings for holding and rotating the tool. Most such machines are limited to tool travel in a straight line over a path no longer than the length of the backing plate to which the work pieces are clamped. Friction-stir welding would derive much benefit from a variation of the current process that would allow hand-guiding and feeding of workpieces along the rotating tool.

Four Japanese patent applications offer alternatives to the work pieces being clamped to a heavy, flat backing plate. These applications describe methods for producing circumferential friction-stir welds on large cylinders, allowing the ends of two cylinders to be joined. These variations still require heavy clamping and do not permit hand guiding of the weld along a non-straight line joint. The Japanese patent applications referred to are Japanese Pat. App. Nos. 10027652, 10141008, 11333572A2, and 10052769A2.

SUMMARY AND OBJECTS OF THE INVENTION

Some embodiments of the present invention entail a friction-stir welding device and process that enables a user to maneuver, multi-directionally, planar or non-planar work pieces along a tool in order to produce non-linear welds. The work pieces need not be clamped or secured to the friction-stir welding device.

In one preferred embodiment, this device operates much like a conventional sewing machine. The edges of the sheets or work pieces are clamped to each other at the point where the weld will begin. An operator then holds the work pieces in his or her hands and guides the joint line, created by these pieces being held together, along the rotating tool. This ability makes it possible for the operator to manipulate the work pieces to make the tool follow along a non-linear and non-planar seam. In this embodiment of the invention the operator controls the speed and movement of the work pieces. Automatic control of speed and movement of the work pieces through the use of sensors and automation technology is a logical enhancement to this embodiment.

This embodiment includes two principal components. A tool with a probed end is mounted on a spindle and located on the top side of the joint line. In the alternative, the tool may be mounted to the bottom side of the joint line. A rotating anvil in the shape of a disk is situated opposite the tool. During welding, the perimeter of the rotating anvil is in contact with the edges of the two work pieces at the joint line, and supports the axial force exerted by the tool. The anvil is driven by a variable-speed motor, causing it to pull the work pieces along the tool by friction force at a speed controlled by the operator. The width of the anvil prevents extrusion of the plasticized weld metal which may otherwise be caused by the tool during welding.

The industries for which present embodiments of this invention are most applicable include the aerospace industry, aluminum sheet manufacturing industry, railway industry, automobile manufacturing industry, construction industry, automobile manufacturing industry, construction industry, electrical industry and other similar industries. The presently preferred embodiment of the invention is particularly applicable to the welding of aluminum; thus, those industries that produce irregularly shaped welds in non-planar sheet aluminum will find the invention particularly useful. Automakers, in particular, desire lighter, more fuelefficient vehicles. Using aluminum for body panels saves hundreds of pounds per vehicle. Aluminum body panels must be formed in relatively small pieces and then welded together. Conventional welding processes create considerable distortion and weld defects. Embodiments of this invention would allow welding of these non-planar, non-straight line joints at comparable speeds and with less distortion and improved quality.

In addition, the aerospace industry, already committed to using aluminum panels, currently relies on rivets to produce joints between aluminum panels because of the risk of metallurgical defects and structural defects occurring in the welds. The use of friction-stir welding, enabled by the novelties discussed herein, would likely raise confidence in and facilitate the use of welded joints in aircraft applications, thereby reducing aircraft fabrication costs.

The aluminum sheet metal manufacturing industry produces aluminum sheet in long, continuous strips. In some cases it is desirable to weld the edges of two strips, possibly of different thicknesses, together to form a wider strip. Although such a joint would be too long to be clamped to a backing plate, the invention disclosed here would allow the continuous friction-stir welding of the edges of two strips as they leave the strip-manufacturing process.

It has been disclosed previously that embodiments of this invention enable an operator to manually guide work pieces through the device. In addition, alternate novel embodiments of the invention enable the replacement of a human operator with automation, such as automatic seam tracking. Automatic seam tracking refers to the use of some form of machine vision such as a digital camera, laser scanner, or other type of sensor, to guide a mechanism along a defined path. In an automatic seam tracking embodiment of the present invention, pairs of driven rollers placed on top and below the work pieces pinch the work pieces to drive them differentially, steering the joint line along the tool by computer control. All control functions rely on sensors and computer-controlled actuators. The need for a human operator, beyond the setting up and start functions, is thus totally eliminated.

Accordingly, it is an object of some embodiments of the present invention to provide a device and system that enables non-linear welds to be made along non-linear joint lines on either planar or non-planar surfaces.

An additional object of some embodiments of the present invention is to provide a method and device for friction-stir welding that allows for welds to be made along curved and non-straight edges.

Another object of some embodiments of the present invention is to provide a method and a device for friction-stir welding that allows a user to easily maneuver work pieces through the device and along the tool.

A further object of some embodiments of the present invention is to provide a method for friction-stir welding, whereby a user or operator manually maneuvers the work pieces through the device and can turn and twist the pieces so as to perform non-linear friction stir welds.

A further object of some embodiments of the present invention is to provide a friction-stir welding device and system where the structure that supports and lies beneath the work pieces while the work pieces are being guided through the tool is made of a material or coated with a material that precludes diffusion welding or friction-stir welding the work pieces to the structure that supports the work pieces.

Yet another object of some embodiments of the present invention is to provide a friction-stir welding device that does not require a special-purpose anvil. Instead, in some embodiments of the present invention, a disk-shaped, rotating anvil will suit a wide variety of joint shapes and curvatures.

These and other objects and features of the present invention will become more fully apparent from the following description, drawings, and the appended claims. Other objects will likewise become apparent from the practice of the invention as set forth hereafter.

BRIEF DESCRIPTION OF THE DRAWINGS

The foregoing and other objects and features of the present invention will become more fully apparent from the accompanying drawings when considered in conjunction with the following description and appended claims. The drawings depict only typical embodiments of the invention and are thus not to be deemed limiting of the invention's scope. The accompanying drawings help explain the invention in added detail.

FIG. 4a depicts the types of work pieces to which conventional friction-stir welding devices are limited.

DETAILED DESCRIPTION OF THE PREFERRED EMBODIMENTS

It is emphasized that the present invention, as illustrated in the figures and description herein, can be embodied in other forms. Thus, neither the drawings nor the following more detailed description of the various embodiments of the system and method of the present invention limit the scope of the invention. The drawings and detailed description are merely representative of the particular embodiments of the invention; the substantive scope of the present invention is limited only by the appended claims. The various embodiments of the invention will best be understood by reference to the drawings, wherein like elements are designated by like alphanumeric characters throughout.

Figure 1:
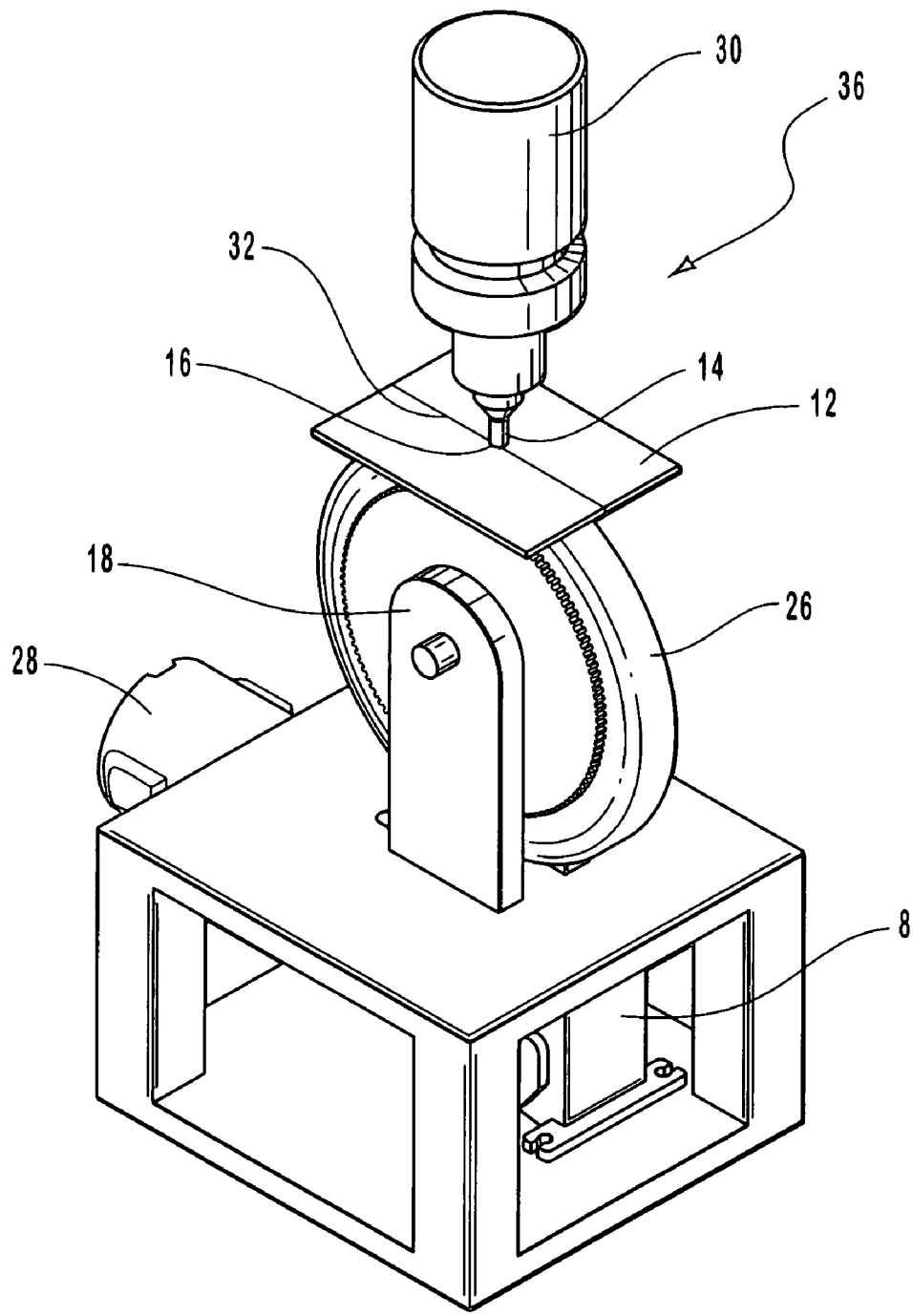
FIG. 1 is an isometric view of the present invention, which defines the shapes of the several elements of this embodiment of the invention and illustrates one means for driving the rotating anvil—a chain drive. Although the joint line shown in FIG. 1 is straight and the work pieces flat, a non-straight joint line and non-planar work pieces are equally applicable to the apparatus and process.
Figure 2:
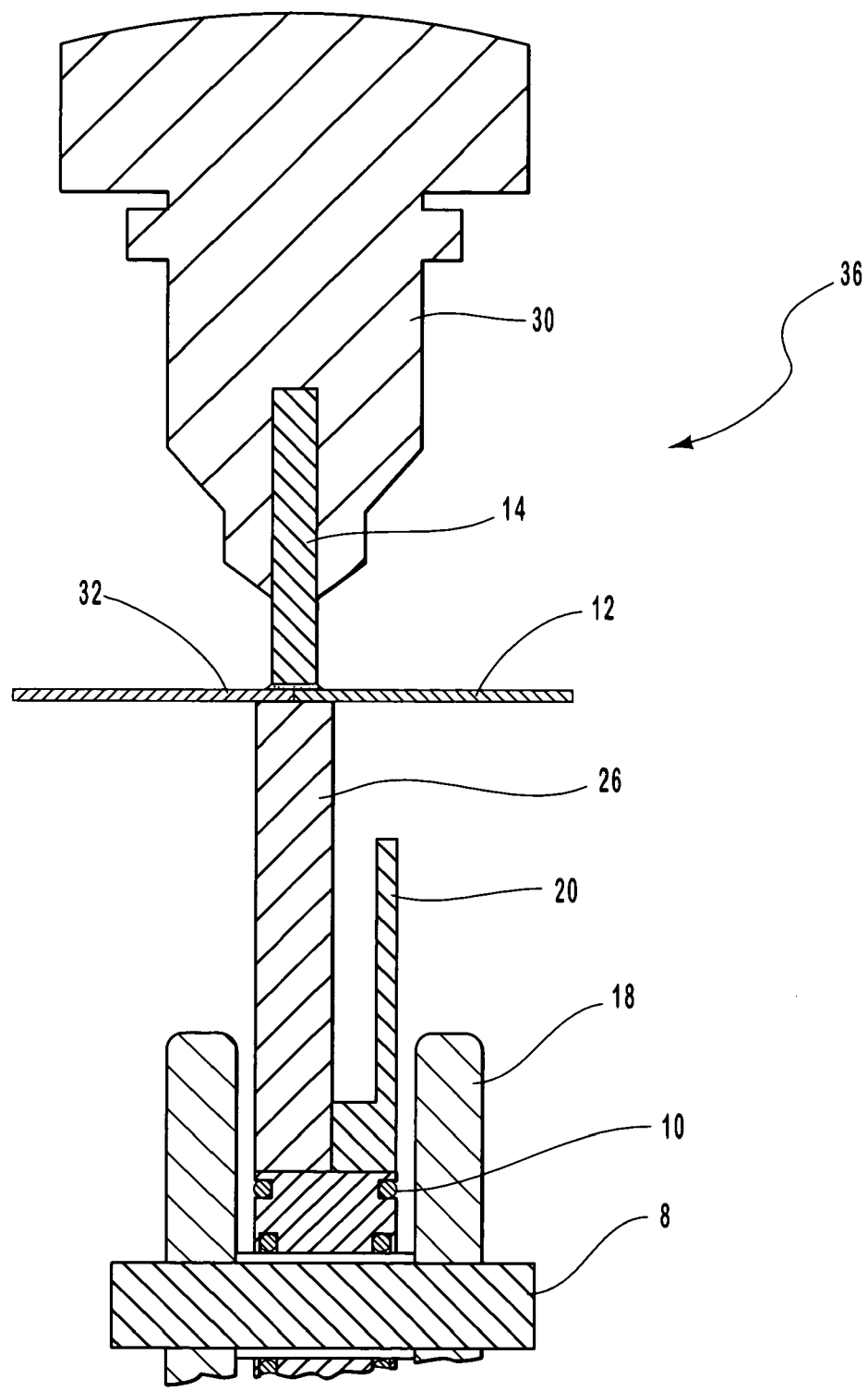
FIG. 2 depicts an embodiment of the present invention including a machine spindle which holds and rotates the friction-stir welding tool, the work pieces with their joint line positioned beneath the tool, and the rotating, disk-shaped anvil below the work piece joint line.

With reference now to the accompanying drawings, FIGS. 1 and 2 depict one embodiment of the friction-stir welding device 36 and method described herein with work pieces 12. In this figure, the non-consumable tool 14, with its profiled, probed end 16, is shown engaged in the joint line 32 between the two work pieces 12. The tool 14 is supported by a motor-driven spindle 30, which resists all reaction forces applied to the tool 14 during welding. The rotating anvil 26 is shown below the work pieces 12, where it supports the force of the tool 14 against the work pieces 12, and, by its driven rotation, pulls the work pieces 12 into the tool 14.

The sequence of operations for the embodiment depicted in FIGS. 1 and 2 is as follows. The operator clamps the edges of the work pieces 12 together and places the joint line 32 upon the anvil 26 and beneath the tool 14. While holding the work pieces 12 the operator actuates by foot pedal (not shown), or by some automatic means, the rotating machine spindle 30 causing it to move towards the anvil 26 and into the joint line 32 between the work pieces 12. The tool 14 stops advancing towards the anvil 26 at either a preset or automatically sensed distance from the anvil 26. Moments after the tool 14 stops advancing, the anvil 26 begins to rotate1 drawing the joint line 32 along the rotating tool 14. The operator manually guides the work pieces 12 such that the tool 14 follows the joint line 32 producing a solid-state weld between the two work pieces 12. Alternatively, an automatic seam-tracking device may guide the joint line 32 along the rotating tool 14.

When the weld has been completed, the operator stops the anvil 26 from rotating and raises the tool spindle 30, thereby withdrawing the tool 14 from the weld. Once the tool 14 is withdrawn from the joint line 32, the spindle 30 rotation stops. The welded work pieces 12 are then manually removed from the system 36 as a one-piece, welded panel.

The driven sprocket 20 shown in FIG. 2 is turned by a chain 42 from a driving sprocket 20 attached to the output shaft of a motor 8. The driven sprocket 20 is attached to the anvil 26, which maintains tight contact with the bottom sides of the work pieces 12. The turning of the anvil 26 pulls the work pieces along the rotating tool 14 while being steered or guided by the operator or some automated seam-tracking system. The speed of rotation of the anvil 26 is controlled by a foot-pedal control (not shown) or by some automatic control.

The anvil 26 rotates on a bearing 10, which resides on a shaft 8 held in place by a support frame 18.

Figure 3:
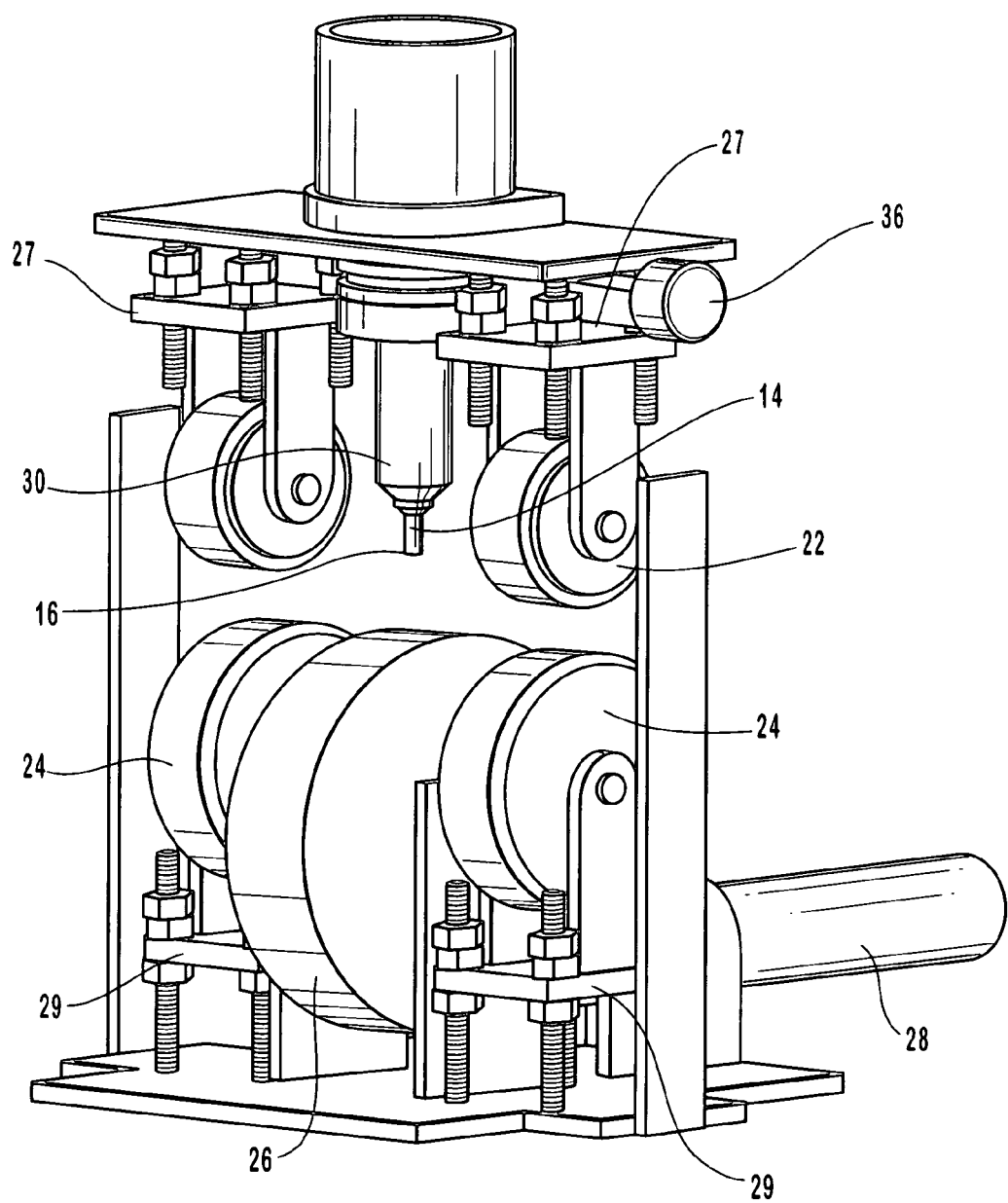
FIG. 3 depicts an alternate embodiment of the present invention, without work pieces, where the tool is in an unengaged position.

FIG. 3 depicts an alternate embodiment of the friction-stir welding device 36 described herein. In this figure, the friction-stir welding device 36 is shown without work pieces 12 and the non-consumable tool 14, with its profiled probed end 16, is in its non-engaged state. That is, the tool 14 is not within the work pieces 12, but instead is stationary on an upper support structure 27.

According to one feature of the alternate embodiment of the present invention, a foot pedal (not shown) or automated controller is activated, causing the upper support structure 27 to lower and make contact with the work pieces 12 as well as with a lower support structure 29. Two opposing topside roller clamps 22 are located on opposite sides of the tool 14. Each is slightly in front or ahead of the tool 14 in order to engage the work pieces 12 prior to engagement of the tool 14. The topside roller clamps 22 reside in a suspended position in tandem with the upper support structure 27, similar to the position of the tool 14.

Two opposing bottom-side roller clamps 24 are located on the lower support structure 29, on each side of a rotating anvil 26. The rotating anvil 26 is replaceable and easily removable. The rotating anvil 26, which may assume a variety of shapes and sizes, is situated between the bottom-side roller clamps 24. Among the alternative surface shapes the anvil 26 may assume are a triangular, parabolic or other shaped surface, so long as the surface enables welding irregular work piece edges. The lower support structure 29 includes an electric motor 28, or alternatively may comprise an electrical power source so as to replace the need for human operation.

Where human operation is required, the sequence of operations for the alternate embodiment of the present invention is as follows. First, an operator takes two pieces of metal 12, preferably aluminum or comparable alloys, and holds them together so that the edges to be welded are in contact. The operator then begins to introduce the work pieces 12 into the device. Thereafter, by either automation or foot pedal activation, the upper support structure 27 is lowered until the topside roller clamps 22 and the bottom-side roller clamps 24 have clasped between them the two held-together work pieces 12. The topside roller clamps 22 and bottom-side roller clamps 24 prevent the work pieces 12 from separating. As the operator guides the work pieces 12 through the device, the tool 14 is lowered and engaged into the joint line 32 or seam of the work pieces 12. Once engaged, the tool's 14 depth within the work pieces' 12 joint line 32 is controlled and guided by the operator and the foot pedal, or alternatively by an entirely automated process. The work pieces 12 are then guided through the device. Once the weld is made, the foot pedal or electrically powered unit directs the tool 14 back into its upright and lifted position within the upper support structure 27. The topside roller clamps 22 and bottom-side roller clamps 24 are also separated and the welded work piece 12, in its completed form, is removed.

A support structure, such as the rotating anvil 26 shown in FIGS. 1, 2, and 3, may serve to support the work pieces 12 as they are guided through the device. The bottom of the tool 14 and the top of the support structure may rise to near melting point during friction-stir welding. If the temperature becomes sufficiently high, the work pieces 12 may become welded to the support structure. To avoid this result, the support structure, may be coated with any of the following: (1) Titanium Carbide; (2) Titanium Nitride; or (3) Aluminum Nitride. Further, any coating with a melting temperature above 500 degrees Celsius, any refractory metal coating, or a refractory sheet applied to the anvil 26 or other support structure will work to preclude welding the work pieces 12 to the support structure.

Figure 4A:
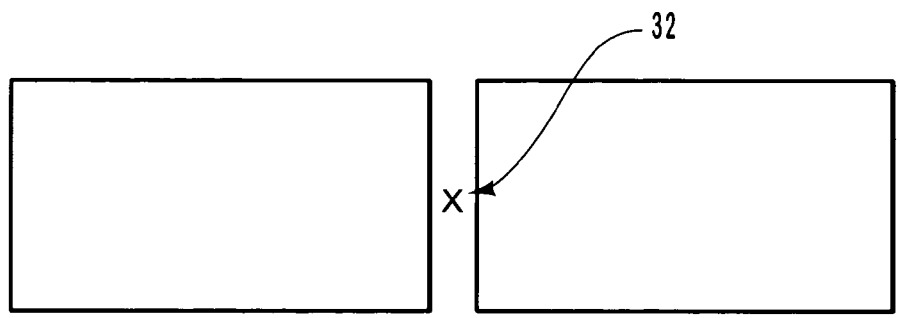
FIGS. 4a, 4b, and 4c depict sample work pieces, all having different joint lines.
Figure 4B:
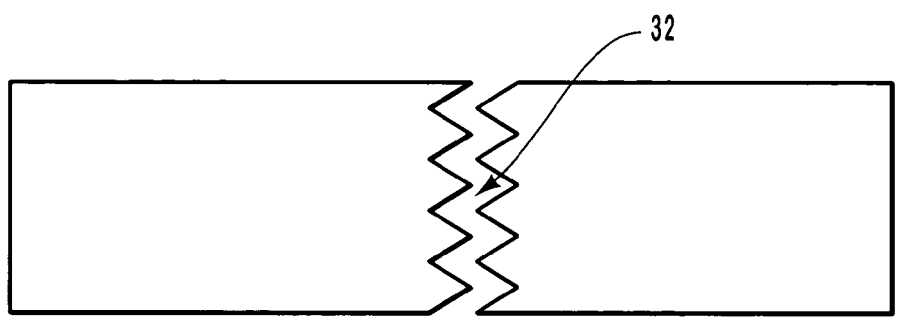
Figure 4C:
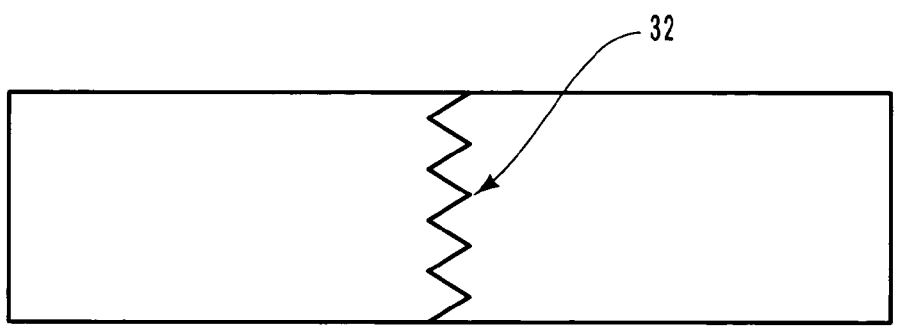

FIGS. 4a, 4b and 4c depict sample work pieces 12 with different joint lines 32. FIG. 4a depicts the type of work pieces 12 that conventional friction-stir welding devices are limited to. Unlike present embodiments of the present invention, conventional techniques require each work piece 12 to be clamped, and the tool 14 to be moved throughout the linear joint line 32 relative to the stationary pieces. FIG. 4b depicts the type of work pieces 12 that can be friction-stir welded with present embodiments of the invention disclosed herein. Such friction-stir welding was not possible with prior art devices and methods. Present embodiments of the invention enable an operator or automated guide to follow along a non-linear joint line 32 with the tool 14 to weld irregular work pieces 12, such as those shown in FIG. 4b, together. FIG. 4c depicts the work pieces 12 of FIG. 4b in their final friction-stir welded form.

Figure 5:
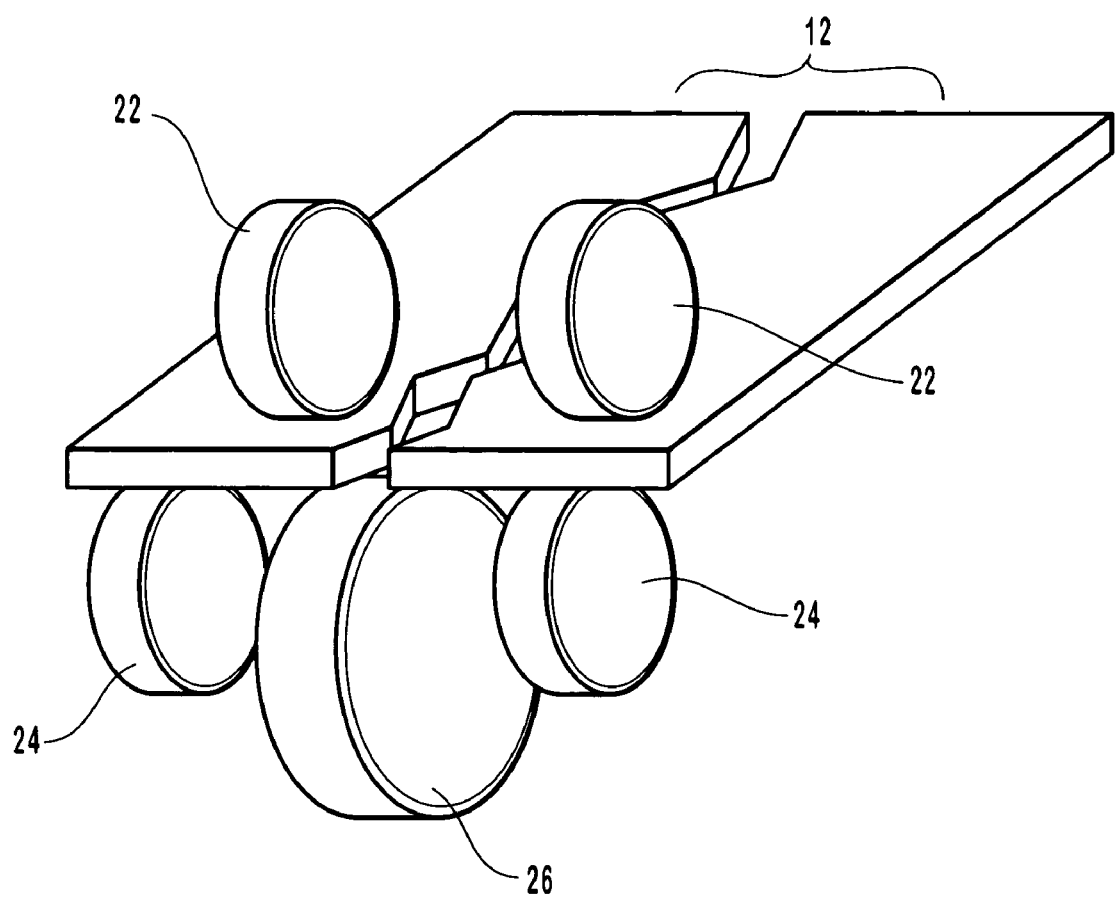
FIG. 5 depicts an illustration of two work pieces with a non-linear joint line going through the device of one embodiment of the present invention. The non-consumable tool is not present in this illustration.

FIG. 5 depicts an illustration of two work pieces 12, with a non-linear joint line 32, passing through the device of one embodiment of the present invention. The non-consumable tool 14 is not represented in this illustration.

Figure 6:
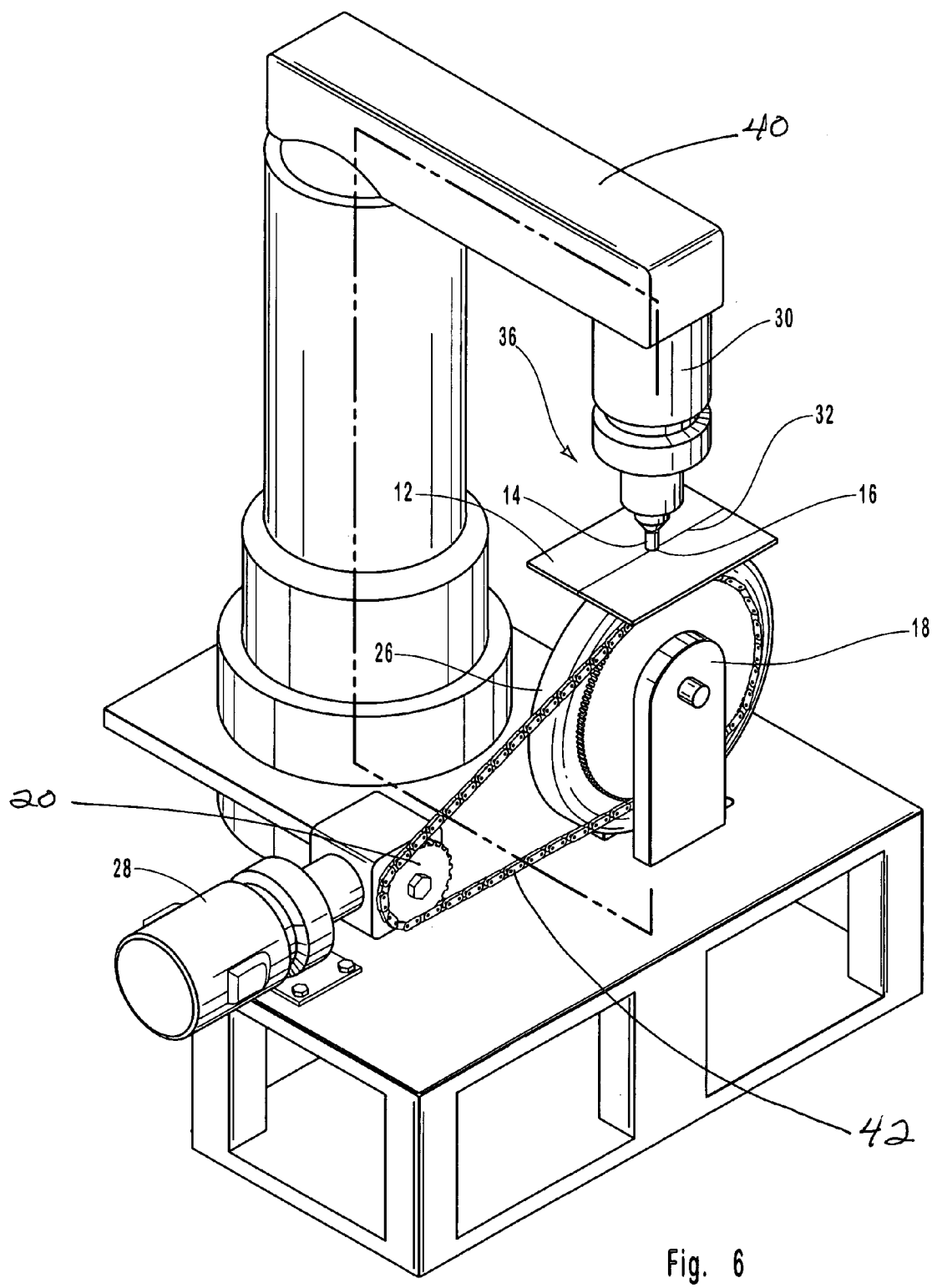
FIG. 6 depicts an embodiment of the present invention that includes a C-frame and a chain.

FIG. 6 depicts one embodiment of the friction-stir welding device 36 and method described herein that includes a C-frame 40 and a chain 42. In this embodiment, the C-frame 40 is connected to the motor-driven spindle 30. The chain 42 connects and turns the driven sprocket 20 and the anvil 26.

What is claimed is:

1. A friction-stir welding system, said friction-stir welding system comprising:
    at least two planar or non-planar workpieces forming a planar or non-planar joint line therebetween;
    a friction-stir welding system having a feed direction and configured to weld the joint line by moving the planar or non-planar workpieces and joint line with respect to the friction-stir welding system, wherein the friction-stir welding system further includes:
       a "C"-frame structure having a first arm and a second arm;
       a friction-stir welding tool attached to said first arm by a spindle, wherein the friction-stir welding tool rotates about a first axis; and
       a disk-shaped anvil mounted to said second arm and having an anvil diameter being greater than its length, wherein the anvil rotates about a second axis, parallel with the feed direction and nonparallel to the first axis, wherein said friction-stir welding tool and said anvil are capable of accommodating and supporting during welding non-planar, multi-dimensional workpieces with a curvilinear, non-planar multi-directional joint line.

2. The system of claim 1, wherein said "C" frame is of any throat dimension and is positioned in any orientation in three-dimensional space.

3. The system of claim 1, wherein said second arm further comprises a support frame.

4. The system of claims 1 or 3, wherein said anvil is driven by a motor.

5. The system of claim 1, wherein said friction-stir welding tool is moveable axially while rotating about said first axis.

6. The system of claim 1, wherein said friction-stir welding tool comprises a probed end.

7. The system of claim 1, wherein said friction-stir welding tool is motor driven.

8. The system of claim 1, wherein:
    said anvil comprises a supporting surface adapted to provide back support to the friction-stir welding tool; and
    the supporting surface is at least one of curved, angled, non-linear, or a combination thereof, in a direction perpendicular to the feed direction.

9. A friction-stir welding system, said friction-stir welding system comprising:
    at least two planar or non-planar workpieces forming a planar or non-planar, and curvilinear joint line therebetween;
    a friction-stir welding apparatus having a feed direction and configured to weld the joint line by moving the planar or non-planar workpieces and the planar or non-planar, and curvilinear joint line with respect to the friction-stir welding apparatus, wherein the friction-stir welding apparatus further includes:
       a "C" frame having a first arm and a second arm;
       a friction-stir welding tool supported by said first arm; and
       a disk-shaped anvil mounted to said second arm and having an anvil diameter being greater than its length, wherein said anvil comprises a surface shape adapted to provide back support to the friction-stir welding tool, and a cross-sectional profile of the surface shape is at least one of curved, angled, non-linear, or a combination thereof, in a direction perpendicular to the feed direction wherein said friction-stir welding tool and said anvil are capable of accommodating and supporting during welding planar and non-planar workpieces with a curvilinear, non-planar, multi-directional joint line.

10. The friction-stir welding system of claim 9 wherein said anvil is comprised of or coated with a material to prevent the workpiece from being welded to said anvil.

11. A friction-stir welding system, said friction-stir welding system comprising:
    at least two planar or non-planar workpieces forming a planar or non-planar joint line therebetween;
    a friction-stir welding system configured to weld the planar or non-planar joint line by moving the planar or non-planar workpieces and joint line with respect to the friction-stir welding system, wherein the friction-stir welding system further includes:
       a "C" frame having a first arm and a second arm;
       a friction-stir welding tool supported by said first arm; and
       a disk-shaped anvil having an anvil diameter being greater than its length mounted to said second arm and having a support surface for receiving the at least two planar or non-planar workpieces during a weld, wherein said friction-stir welding tool and said anvil are capable of accommodating and supporting during welding non-planar workpieces with a curvilinear, non-planar, multi-directional joint line.

12. A system as in claim 11, wherein said workpieces are non-planar and wherein said joint line is curvilinear in at least two dimensions.

13. A system as in claim 11, wherein said joint line is non-linear with respect to a midline axis between the first and second arm.

14. A friction-stir welding system, said friction-stir welding system comprising:
    at least two planar or non-planar workpieces forming a planar or non-planar joint line therebetween;
    a friction-stir welding system having a feed direction and configured to weld the planar or non-planar joint line by moving the planar or non-planar workpieces and planar or non-planar joint line with respect to the friction-stir welding system, wherein the friction-stir welding system further includes:
       a "C" frame having a first arm and a second arm;
       a friction-stir welding tool supported by said first arm, wherein said friction-stir welding tool spins on an axis in a cylindrical motion into and against the at least two planar or non-planar workpieces that are traveling in said feed direction, and wherein said feed direction is substantially perpendicular to said axis of cylindrical motion of said friction stir welding tool; and
       a disk-shaped anvil mounted to said second arm and having an anvil diameter being greater than its length, wherein said anvil rotates in said feed direction as said workpieces pass between said anvil and said tool providing exclusive support to said workpieces during a weld, wherein said friction-stir welding tool and said anvil are capable of accommodating and supporting during welding non-planar, multi-dimensional workpieces with a curvilinear, non-planar multi-directional joint line.

15. A friction-stir welding system, said friction-stir welding system comprising:
    at least two workpieces forming a joint line therebetween;
    a friction-stir welding system configured to weld the joint line by moving the workpieces and joint line with respect to the friction-stir welding system, wherein the friction-stir welding system further includes:
a "C" frame having a first arm and a second arm;
a friction-stir welding tool supported by said first arm, wherein said friction-stir welding tool cylindrically spins about a first axis as it penetrates the at least two workpieces during performance of a weld; and
a disk-shaped anvil having an anvil diameter being greater than its length mounted to said second arm and having a support surface that supports said workpieces and rotates as the workpieces pass by the tool, there being no relative movement between the workpiece and anvil as they contact under the tool, wherein said friction-stir welding tool and said anvil are capable of accommodating and supporting during welding non-planar, multi-dimensional workpieces with a curvilinear, non-planar multi-directional joint line.

16. A friction-stir welding system, said friction-stir welding system comprising:
a "C"-frame structure having a first arm and a second arm;
a friction-stir welding tool attached to said first arm by a spindle, wherein the friction-stir welding tool rotates about a first axis; and
a disk-shaped anvil mounted to said second arm and having an anvil diameter being greater than its length, wherein the anvil rotates about a second axis, parallel with a feed direction and nonparallel to the first axis, a workpiece having a complex curve, said welding tool and said anvil cooperating to press against the workpiece at a point so that the workpiece is manipulated in three dimensions to create a complex curvilinear, non-planar curved weld.

17. A friction-stir welding system, said friction-stir welding system comprising:
at least two planar or non-planar workpieces forming a planar or non-planar joint line therebetween;
a friction-stir welding system configured to weld the planar or non-planar joint line by moving the planar or non-planar workpieces and the planar or non-planar joint line with respect to the friction-stir welding system, wherein the friction-stir welding system further includes:
a "C" frame having a first arm and a second arm;
a friction-stir welding tool supported by said first arm; and
a disk-shaped anvil having an anvil diameter being greater than its length mounted to said second arm and having a support surface for receiving the at least two workpieces during a weld, wherein said friction-stir welding tool and said anvil are capable of accommodating and supporting during welding a curvilinear, non-planar joint line.

18. A friction-stir welding system, said friction-stir welding system comprising:
at least two planar or non-planar workpieces forming a planar or non-planar joint line therebetween;
a friction-stir welding system having a feed direction and configured to weld the planar or non-planar joint line by moving the planar or non-planar workpieces and the planar or non-planar joint line with respect to the friction-stir welding system, wherein the friction-stir welding system further includes:
a "C" frame having a first arm and a second arm;
a friction-stir welding tool supported by said first arm, wherein said friction-stir welding tool spins on an axis in a cylindrical motion into and against the at least two planar or non-planar workpieces that are traveling in said feed direction, and wherein said feed direction is substantially perpendicular to said axis of cylindrical motion of said friction stir welding tool; and
a disk-shaped anvil mounted to said second arm and having an anvil diameter being greater than its length, wherein said anvil rotates in said feed direction as said planar or non-planar workpieces pass between said anvil and said tool providing exclusive support to said planar or non-planar workpieces during a weld, wherein said friction-stir welding tool and said anvil are capable of accommodating and supporting during welding non-planar, three-dimensional workpieces comprising a complex curve including a curvilinear, non-planar joint line.

* * * * *